United States Patent
Wang

(10) Patent No.: US 9,407,532 B2
(45) Date of Patent: Aug. 2, 2016

(54) METHOD FOR GENERATING TUNNEL FORWARDING ENTRY AND NETWORK DEVICE

(71) Applicant: HUAWEI TECHNOLOGIES CO., LTD., Shenzhen (CN)

(72) Inventor: Xinping Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 317 days.

(21) Appl. No.: 14/083,800

(22) Filed: Nov. 19, 2013

(65) Prior Publication Data
US 2014/0082197 A1  Mar. 20, 2014

Related U.S. Application Data

(63) Continuation of application No. PCT/CN2011/074288, filed on May 19, 2011.

(51) Int. Cl.
*H04L 12/721* (2013.01)
*H04L 12/24* (2006.01)
*H04L 29/06* (2006.01)
*H04L 12/46* (2006.01)

(52) U.S. Cl.
CPC ............ *H04L 45/14* (2013.01); *H04L 12/4633* (2013.01); *H04L 41/04* (2013.01); *H04L 41/12* (2013.01); *H04L 69/02* (2013.01)

(58) Field of Classification Search
CPC ......... H04L 41/00; H04L 43/00; H04L 51/00; H04L 61/00; H04L 65/00; H04L 67/00; H04L 69/00; H04L 45/00; H04L 45/14; H04L 69/02
See application file for complete search history.

(56) References Cited

U.S. PATENT DOCUMENTS 6,948,003 B1 * 9/2005 Newman ............... H04L 41/18
                                                      709/250
7,126,907 B2 * 10/2006 Carpini ................. H04L 45/00
                                                      370/218

(Continued)

FOREIGN PATENT DOCUMENTS

CN          1947390 A        4/2007
CN         101035019         9/2007

(Continued)

OTHER PUBLICATIONS

International Search Report mailed Mar. 1, 2012, in corresponding International Application No. PCT/CN2011/074288.

(Continued)

*Primary Examiner* — Wing F Chan
*Assistant Examiner* — Billy H Ng
(74) *Attorney, Agent, or Firm* — Staas & Halsey LLP

(57) ABSTRACT

The present invention relates to a method for generating a tunnel forwarding entry and a network device. An active master node in a virtual cluster network element VNE generates, according to a preconfigured tunnel service, tunnel service information with the VNE being a single network element; the active master node determines multiple nodes through which a tunnel that corresponds to the tunnel service information passes in the VNE, and node statuses of the multiple nodes through which the tunnel passes in the VNE; and local tunnel forwarding entries are generated, according to the tunnel service information and the node statuses of the multiple nodes through which the tunnel passes in the VNE, for the multiple nodes through which the tunnel passes in the VNE.

18 Claims, 7 Drawing Sheets

(56) References Cited

U.S. PATENT DOCUMENTS

| | | | |
|---|---|---|---|
| 7,616,637 B1* | 11/2009 | Lee | H04L 12/4604 370/394 |
| 7,936,780 B1* | 5/2011 | Kompella | H04L 45/507 370/254 |
| 2001/0019554 A1* | 9/2001 | Nomura | H04L 45/50 370/389 |
| 2004/0024912 A1 | 2/2004 | Fukao et al. | |
| 2005/0259646 A1 | 11/2005 | Smith et al. | |
| 2008/0170573 A1 | 7/2008 | Ould-Brahim | |
| 2009/0092043 A1 | 4/2009 | Lapuh et al. | |
| 2009/0141703 A1 | 6/2009 | Ghodrat et al. | |
| 2009/0141729 A1* | 6/2009 | Fan | H04L 12/4633 370/401 |
| 2010/0302940 A1 | 12/2010 | Patel et al. | |
| 2012/0027013 A1* | 2/2012 | Napierala | H04L 45/04 370/390 |

FOREIGN PATENT DOCUMENTS

| | | |
|---|---|---|
| CN | 101447919 A | 6/2009 |
| CN | 101822006 | 9/2010 |
| CN | 101931587 | 12/2010 |
| WO | 2006/046896 A1 | 5/2006 |
| WO | 2011/046730 A1 | 4/2011 |

OTHER PUBLICATIONS

International Search Report and Written Opinion on Search Authority issued on Mar. 1, 2012 in corresponding International Application No. PCT/CN2011/074288.

Chinese Search Report mailed Aug. 6, 2014, in corresponding Chinese Patent Application No. 2011800008506.

Chinese Office Action mailed Aug. 22, 2014, in corresponding Chinese Patent Application No. 201180000850.6.

\* cited by examiner

METHOD FOR GENERATING TUNNEL FORWARDING ENTRY AND NETWORK DEVICE

CROSS-REFERENCE TO RELATED APPLICATIONS

This application is a continuation of International Application No. PCT/CN2011/074288, filed on May 19, 2011, which is hereby incorporated by reference in its entirety.

FIELD OF THE INVENTION

The present invention relates to the communications field, and in particular, to a method for generating a tunnel forwarding entry and a network device.

BACKGROUND OF THE INVENTION

Currently, conventional PoP networking architecture has a two-layer or multi-layer hierarchy, and as shown in FIG. 1, is divided into different layers according to functions and deployment locations. For example, it can be divided into a core layer, a convergence layer, an edge access layer, and a peer layer. A dual-homing redundant connection is generally used between these layers to improve reliability, and converge and route user traffic layer by layer.

As network traffic and broadband users keep increasing, a carrier generally performs scale expansion once every one or two years. An expansion method mainly includes adding a PoP layer, increasing the number of devices, or changing a device platform capacity or a port capacity.

On a network, an access layer device is responsible for user traffic access, provides abundant user interface types, and features an extensive node distribution and a high port density; a convergence layer device is responsible for converging and routing access node traffic, expands a service coverage range of a core node, and features abundant port types, a powerful convergence capability, and a comprehensive service processing capability; and a core layer device is responsible for high-speed forwarding, interconnects and routes services between areas, and features a small number of nodes.

The PoP network architecture shown in FIG. 1 is formed by various devices, and a dual-homing interconnection between these devices occupies a large number of physical ports. Therefore, device port resources and energy are seriously wasted, and the more layers are converged, the more device port resources and energy are wasted. In this type of network architecture, many network devices exist and have various types and service capabilities, and therefore the topology structure is complicated. This results in difficult service convergence and expansion, complex configuration, high system overhead, and poor global coordination. In addition, deployments of the security, OAM, reliability, and QoS are complex and unsmooth. The more layers are converged, the more internal forwarding hops are, which results in slow routing convergence, a poor routing stability, and difficult fault management.

As the network scale, traffic, and user quantity keep increasing, more PoP points exist on an IP bearer network, the network becomes denser, and a degree of interconnection becomes higher. Therefore, the network structure needs to be integrated and simplified to improve a resource utilization, reduce a cost, reduce energy consumption, lower management complexity, and improve routing convergence and stability.

In the prior art, a virtual switching system (VSS, virtual switching system) exists. On this system, two physical switches constitute one virtual switch, and control and management planes are centralized in one of the physical switches. This system is mainly provided for two or more master switching devices at a same network layer and is applicable to a simple chain or ring topology. However, this virtual switching system has no application for a tunnel.

SUMMARY OF THE INVENTION

One objective of the present invention is to provide a method for generating a tunnel forwarding entry and a network device.

Technical solutions of the present invention are as follows:

According to one aspect, the present invention discloses a method for generating a tunnel forwarding entry, and the method includes:

generating, by an active master node in a virtual cluster network element VNE, according to a preconfigured tunnel service, tunnel service information with the VNE being a single network element, where the tunnel service information includes an incoming label and an outgoing label of a tunnel in the VNE, an outbound interface identifier of the tunnel in the VNE, a next hop of the tunnel in the VNE, a global tunnel (identifier tunnel ID), and an internal VNE label that corresponds to the global tunnel ID;

determining, by the active master node, multiple nodes through which the tunnel that corresponds to the tunnel service information passes in the VNE, and node statuses of the multiple nodes through which the tunnel passes in the VNE; and generating, according to the tunnel service information and the node statuses of the multiple nodes through which the tunnel passes in the VNE, local tunnel forwarding entries for the multiple nodes through which the tunnel passes in the VNE.

Alternatively, according to another aspect, the present invention discloses a network device, including:

a tunnel service information generating unit, configured to generate, according to a preconfigured tunnel service, tunnel service information with a virtual cluster network element VNE on which the network device is located being a single network element, where the tunnel service information includes an incoming label and an outgoing label of a tunnel in the VNE, an inbound interface identifier and an outbound interface identifier of the tunnel in the VNE, a next hop of the tunnel in the VNE, a global tunnel identifier tunnel ID, and an internal VNE label that corresponds to the global tunnel ID;

a node status determining unit, configured to determine multiple nodes through which the tunnel that corresponds to the tunnel service information passes in the VNE, and node statuses of the multiple nodes through which the tunnel passes in the VNE; and a local tunnel forwarding information generating unit, configured to generate, according to the tunnel service information and the node statuses of the multiple nodes through which the tunnel passes in the VNE, local tunnel forwarding information for the multiple nodes through which the tunnel passes in the VNE.

Alternatively, according to another aspect, the present invention discloses a network device, including:

a tunnel service information generating unit, configured to generate, according to a preconfigured tunnel service, tunnel service information with a virtual cluster network element VNE on which the network device is located being a single network element, where the tunnel service information includes an incoming label and an outgoing label of a tunnel in the VNE, an inbound interface identifier and an outbound interface identifier of the tunnel in the VNE, a global tunnel identifier tunnel ID, and an internal VNE label that corresponds to the global tunnel ID;

a node status determining unit, configured to determine multiple nodes through which the tunnel that corresponds to the tunnel service information passes in the VNE, and node statuses of the multiple nodes through which the tunnel passes in the VNE; and an information sending unit, configured to send the tunnel service information to the multiple nodes through which the tunnel passes in the VNE, and send the node statuses of the multiple nodes themselves to each of the multiple nodes through which the tunnel passes in the VNE.

Alternatively, according to another aspect, the present invention discloses a method for generating a tunnel forwarding entry, and the method includes:

generating, by an active master node in a virtual cluster network element VNE, according to a preconfigured tunnel service, tunnel service information with the VNE being a single network element, where the tunnel service information includes an outgoing label of a tunnel in the VNE, an outbound interface identifier of the tunnel in the VNE, a global tunnel identifier tunnel ID, and an IP address of an endpoint of the tunnel that corresponds to the tunnel service information outside the VNE, or the tunnel service information includes an inbound interface identifier of the tunnel in the VNE and an incoming label of the tunnel in the VNE;

determining, by the active master node, one of multiple nodes in the VNE as an endpoint of the tunnel that corresponds to the tunnel service information in the VNE; and sending, by the active master node, the tunnel service information to the endpoint of the tunnel in the VNE.

Alternatively, according to another aspect, the present invention discloses a network device, including:

a tunnel service information generating unit, configured to generate, according to a preconfigured tunnel service, tunnel service information with a VNE being a single network element, where the tunnel service information includes an outgoing label of a tunnel in the VNE, an outbound interface identifier of the tunnel in the VNE, a global tunnel identifier tunnel ID, and an IP address of an endpoint of the tunnel that corresponds to the tunnel service information outside the VNE, or the tunnel service information includes an inbound interface identifier of the tunnel in the VNE and an incoming label of the tunnel in the VNE;

a tunnel endpoint determining unit, configured to determine one of multiple nodes in the VNE as an endpoint of the tunnel that corresponds to the tunnel service information in the VNE; and a tunnel service information sending unit, configured to send the tunnel service information to the endpoint of the tunnel in the VNE.

Advantages of the present invention are as follows: A virtual cluster network element (VNE) is enabled to support a tunnel function, and in addition, the VNE that includes multiple physical nodes functions as only one device for other devices, thereby simplifying a network structure and facilitating network management.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

An embodiment of the present invention is as follows:

In this embodiment, a virtual cluster network element (VNE) includes at least two physical network nodes, and the VNE is a single network node in virtual cluster mode, functions as a single network element for other devices on a network, and serves as a provider device, that is, a P device on the network. In addition, the network according to this embodiment further includes at least two provider edges, that is, PE nodes, and they are a first PE and a second PE. A tunnel is established between the first PE, the VNE, and the second PE, and the first PE and the second PE are two endpoints of the tunnel. Preferably, the tunnel is a label switching path (LSP) tunnel or a traffic engineering (TE) tunnel.

Figure 1:
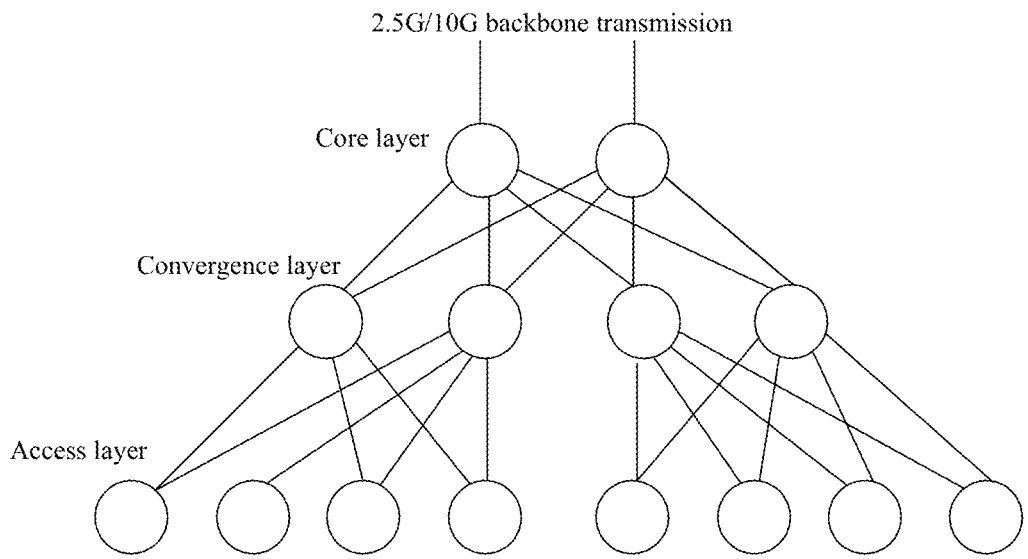
FIG. 1 is a schematic diagram of a network in the prior art.
Figure 2:
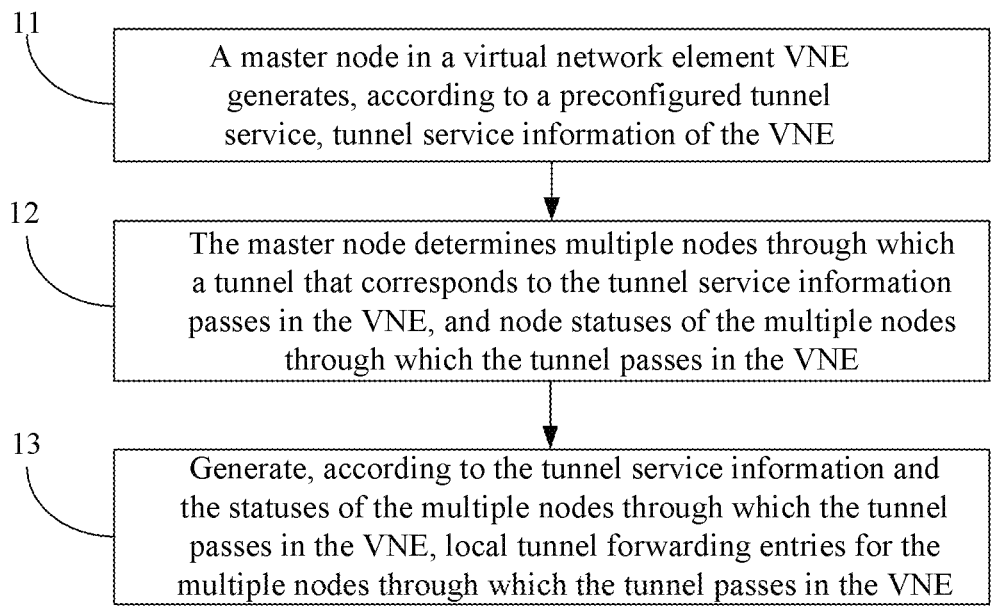
FIG. 2 is a flowchart of a method according to an embodiment of the present invention.

As shown in FIG. 1, a method according to this embodiment is as follows:

11. An active master node in the virtual cluster network element (VNE) generates, according to a preconfigured tunnel service, tunnel service information with the VNE being a single network element.

The tunnel service information includes an incoming label and an outgoing label of a tunnel in the VNE, an outbound interface identifier of the tunnel in the VNE, a next hop of the tunnel in the VNE, a global tunnel identifier tunnel ID, and an internal VNE label that corresponds to the global tunnel ID. Preferably, the tunnel service information further includes an inbound interface identifier of the tunnel in the VNE.

Pre-configuration of the tunnel service may be implemented in a static pre-configuration manner or a dynamic pre-configuration manner.

The active master node may have not only a control function but also a forwarding function, and may also have only the control function and do not have the forwarding function.

Preferably, the global tunnel ID indicates a unified tunnel ID of the tunnel among all nodes in the VNE.

Preferably, each of multiple nodes in the VNE maintains an internal VNE forwarding entry from itself to the other nodes among the multiple nodes. The internal VNE forwarding entry includes a destination node identifier, an outbound interface identifier that corresponds to the destination node identifier, and next hop information. In addition, the active master node acquires all the internal VNE forwarding entries, that is, the active master node acquires internal VNE forwarding entries that are maintained by each of the multiple nodes. The multiple nodes in the VNE are all nodes in the VNE or part of nodes in the VNE.

Figure 3:
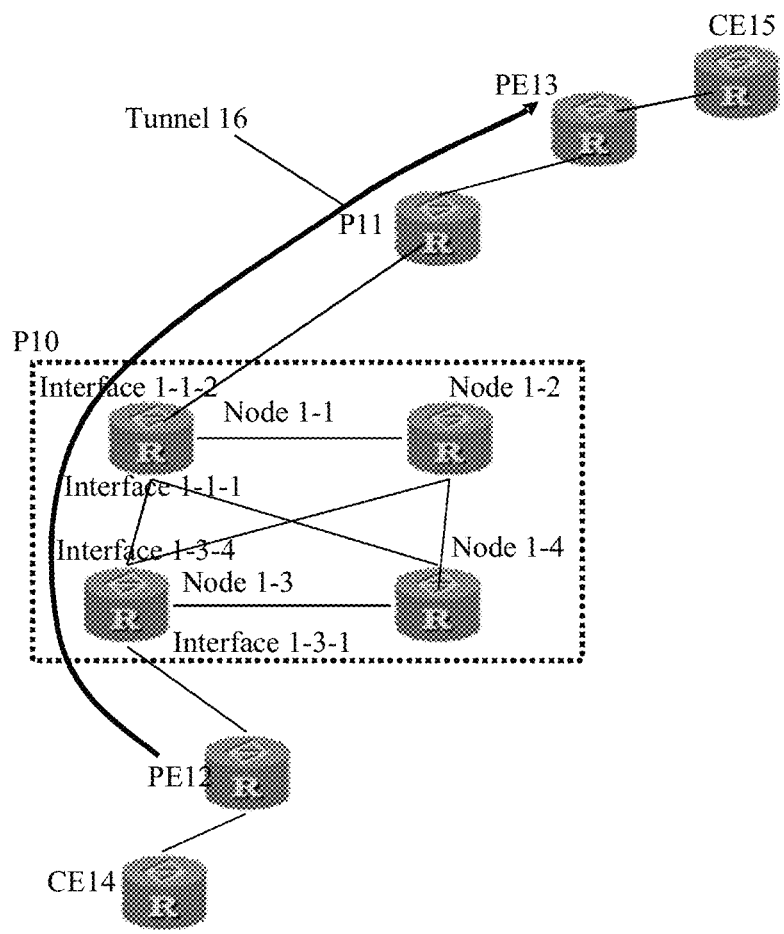
FIG. 3 is a schematic diagram of a network according to an embodiment of the present invention.
Figure 4:
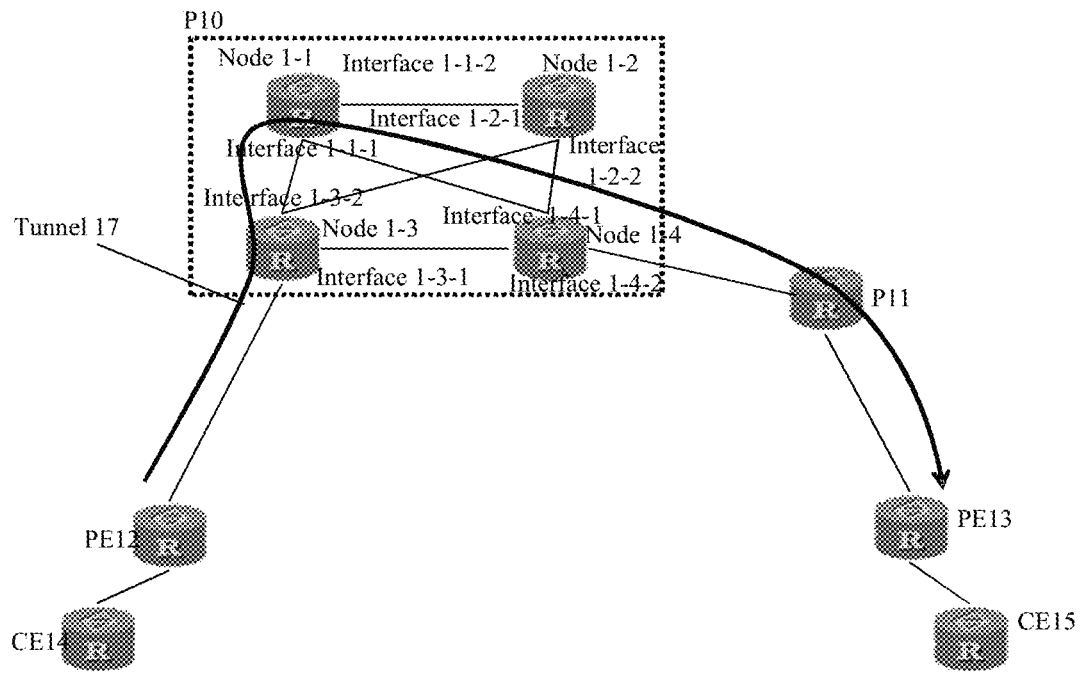
FIG. 4 is a schematic diagram of a network according to an embodiment of the present invention.

The virtual cluster network element (VNE) includes multiple physical nodes, and preferably, the physical nodes are routers or switches. The VNE is a network element that is established of multiple hardware devices in virtual cluster mode, and the VNE functions as one device for other devices on the network. As shown in FIG. 3 or FIG. 4, the VNE is a provider device (P) 10 on the network, and the network at least further includes a provider device (P) 11, a provider edge (PE) 12, a provider edge (PE) 13, a customer edge (CE) 14, and a customer edge (CE) 15. In the VNE 10, a node 1-1 is an active master node, a node 1-2 is a standby master node, a node 1-3 is a first slave node, and a node 1-4 is a second slave node.

As shown in FIG. 3, a tunnel 16 is established between the PE 12 and the PE 13; and as shown in FIG. 4, a tunnel 17 is established between the PE 12 and the PE 13. Both the tunnel 16 and the tunnel 17 pass through the P 10, that is, the VNE, and also pass through the P 11.

On the network shown in FIG. 3, a start point of the tunnel 16 is the PE 12, an end point is the PE 13, and in the VNE, the tunnel 16 passes through two nodes, that is, the node 1-1 and the node 1-3, where the node 1-3 is an ingress node, the node 1-1 is an egress node, an interface 1-3-1 on the node 1-3 is an inbound interface of the tunnel in the VNE, and an interface 1-1-2 on the node 1-1 is an outbound interface of the tunnel in the VNE.

Tunnel service information of the tunnel 16 includes an incoming label and an outgoing label of the tunnel 16 in the VNE, an inbound interface identifier and an outbound interface identifier of the tunnel 16 in the VNE, a global tunnel ID of the tunnel 16, and an internal VNE label that corresponds to the global tunnel ID of the tunnel 16. The inbound interface identifier of the VNE carries a node identifier of a node on which the inbound interface is located. For example, the interface 1-3-1 is the inbound interface of the tunnel 16 in the VNE, and its interface identifier carries a node identifier of the node 1-3; and the interface 1-1-2 is the outbound interface of the tunnel 16 in the VNE, and its interface identifier carries a node identifier of a node P 1-1.

On the network shown in FIG. 4, a start point of the tunnel 17 is the PE 12, an end point is the PE 13, and in the VNE 10, the tunnel 17 passes through three nodes, that is, the node 1-1, the node 1-3, and the node 1-4, where the node 1-3 is an ingress node, the node 1-4 is an egress node, the interface 1-3-1 on the node 1-3 is an inbound interface and an interface 1-4-2 on the node 1-4 is an outbound interface.

Tunnel service information of the tunnel 17 includes an incoming label and an outgoing label of the tunnel 17 in the VNE, an inbound interface identifier and an outbound interface identifier of the tunnel 17 in the VNE, a global tunnel ID of the tunnel 17, and an internal VNE label that corresponds to the global tunnel ID of the tunnel 17. The inbound interface identifier of the VNE carries a node identifier of a node on which the inbound interface is located. For example, the interface 1-3-1 is the inbound interface of the tunnel 17 in the VNE, and its interface identifier carries the node identifier of the node 1-3; and the interface 1-4-2 is the outbound interface of the tunnel 17 in the VNE, and its interface identifier carries a node identifier of the node 1-4.

12. The active master node determines multiple nodes through which the tunnel that corresponds to the tunnel service information passes in the VNE, and node statuses of the multiple nodes through which the tunnel passes in the VNE.

In this embodiment of the present invention, local tunnel forwarding entries need to be generated for the multiple nodes through which the tunnel passes in the VNE. Before the local tunnel forwarding entries are generated, specific nodes through which the tunnel passes in the VNE need to be determined.

In this embodiment, the tunnel service information includes an inbound interface identifier and an outbound interface identifier of the tunnel that corresponds to the tunnel service information in the VNE, and in addition, the inbound interface identifier includes a node identifier of an ingress node on which an inbound interface is located, and the outbound interface identifier includes a node identifier of an egress node on which an outbound interface is located. Therefore, the active master node determines, according to the inbound interface identifier and the outbound interface identifier, the ingress node and the egress node of the tunnel in the VNE.

On the network shown in FIG. 3, an active master node P 1-1 determines, according to the interface identifier of the interface 1-3-1, that is, the inbound interface of the tunnel 16 in the VNE, in the tunnel service information, a node identifier of the ingress node on which the interface 1-3-1 is located, that is, the node identifier of the node 1-3. Likewise, the active master node 1-1 may further determine a node identifier of the egress node of the tunnel 16 in the VNE, that is, the node identifier of the node 1-1.

On the network shown in FIG. 4, the active master node 1-1 determines, according to the interface identifier of the interface 1-3-1, that is, the inbound interface of the tunnel 17 in the VNE, in the tunnel service information, a node identifier of the ingress node on which the interface 1-3-1 is located, that is, the node identifier of the node 1-3. Likewise, the active master node 1-1 may further determine a node identifier of the egress node of the tunnel 17 in the VNE, that is, the node identifier of the node 1-4.

When the tunnel passes through only two nodes in the VNE, the ingress node and the egress node are determined, indicating that the active master node has determined all nodes through which the tunnel passes in the VNE, and corresponding node statuses are also determined.

As shown in FIG. 3, a tunnel 1 passes through only two nodes, that is, the node 1-3 and the node 1-1, where the node 1-3 is the ingress node and the node 1-1 is the egress node.

Preferably, the following situation may also exist: The tunnel passes through more than two nodes in the VNE. In this situation, the ingress node and the egress node need to be determined, and in addition, an intermediate node through which the tunnel passes in the VNE further needs to be determined.

A method for determining an intermediate node through which the tunnel passes in the VNE includes: taking, by the active master node, the node identifier of the egress node as a destination identifier to query an internal VNE forwarding entry of the ingress node and determine a next hop that corresponds to the node identifier of the egress node; determining, according to the next hop that corresponds to the node identifier of the egress node, an interface identifier of a node that is connected to the ingress node; determining, according to the interface identifier of the node that is connected to the ingress node, a node identifier of the node that is connected to the ingress node; determining that the node identifier of the node that is connected to the ingress node is different from the node identifier of the egress node; and determining that the node that is connected to the ingress node is an intermediate node of the tunnel in the VNE. In this way, an intermediate node nearest to the ingress node in the VNE can be determined, and it is called a first intermediate node.

Preferably, by referring to the method for determining the first intermediate node, the active master node takes the node identifier of the egress node as the destination identifier to query an internal VNE forwarding entry of the first intermediate node and determine the next hop that corresponds to the node identifier of the egress node; determines, according the next hop that corresponds to the node identifier of the egress node, an interface identifier of a node that is connected to the first intermediate node; determines, according to the interface identifier of the node that is connected to the first intermediate node, a node identifier of the node that is connected to the first intermediate node; determines that the node identifier of the node that is connected to the first intermediate node is different from the node identifier of the egress node; and determines that the node that is connected to the first intermediate node is a second intermediate node.

The rest is deduced through analogy until a node identifier of a node (a node n+1) that is connected to an n$^{th}$ intermediate node is the same as the node identifier of the egress node. In this case, all intermediate nodes of the tunnel in the VNE are found.

As shown in FIG. 4, the ingress node of the tunnel 17 is the node 1-3 and the egress node is the node 1-4. In addition, the tunnel 17 also passes through an intermediate node in the VNE. In this embodiment of the present invention, specific intermediate nodes through which the tunnel 17 passes further need to be determined.

The active master node 1-1 takes the node identifier of the node 1-4 as the destination identifier to query an internal VNE forwarding entry of the node 1-3 and determine a next hop that corresponds to the node identifier of the node 1-4. As the active master node, the node 1-1 has internal VNE forwarding entries of all the nodes in the VNE. Therefore, the internal VNE forwarding entry of the node 1-3 can be queried on the node 1-1.

An interface identifier of a node that is connected to the node 1-3, such as an interface identifier of an interface 1-1-1, is determined according to the next hop.

The node identifier of the node 1-1 on which the interface 1-1-1 is located is determined according to the interface identifier of the interface 1-1-1.

It is determined that the node identifier of the node 1-1 is different from the node identifier of the egress node 1-4, thereby determining that the node 1-1 is not the egress node, that is, determining that the node 1-1 is an intermediate node of the tunnel 17 in the VNE.

Multiple intermediate nodes of the tunnel 17 may exist in the VNE, and therefore the active master node 1-1 needs to continue to perform intermediate node determining.

The active master node 1-1 takes the node identifier of the node 1-4 as the destination identifier to query an internal VNE forwarding entry of the node 1-1 and determine the next hop that corresponds to the node identifier of the node 1-4.

An interface identifier of a node that is connected to the node 1-1, such as an interface identifier of an interface 1-4-1, is determined according to the next hop.

The node identifier of the node 1-4 on which the interface 1-4-1 is located is determined according to the interface identifier of the interface 1-4-1.

It is determined that the node identifier of the node 1-4 is the node identifier of the egress node, that is to say, the node that is connected to the node 1-1 is not an intermediate node but the egress node.

In this way, the node statuses of all the nodes of the tunnel 17 in the VNE are determined, where the node 1-3 is the ingress node, the node 1-4 is the egress node, and the node 1-1 is the intermediate node.

13. Generate, according to the tunnel service information and the node statuses of the multiple nodes through which the tunnel passes in the VNE, local tunnel forwarding entries for the multiple nodes through which the tunnel passes in the VNE.

The generating local tunnel forwarding entries for the multiple nodes through which the tunnel passes in the VNE includes generating local tunnel forwarding entries for the ingress node and the egress node.

Optionally, a method for generating a local tunnel forwarding entry for the ingress node is as follows:

The active master node queries the internal VNE forwarding entry of the ingress node according to the node identifier of the egress node, and determines a local next hop of the ingress node and a local outbound interface identifier of the ingress node;

the active master node generates local tunnel forwarding information of the ingress node for the ingress node, where the local tunnel forwarding information of the ingress node includes the incoming label of the tunnel in the VNE, the global tunnel ID, the local next hop of the ingress node, the local outbound interface identifier of the ingress node, and the internal VNE label that corresponds to the global tunnel ID; and the active master node sends the local tunnel forwarding information of the ingress node to the ingress node, so that the ingress node generates the local tunnel forwarding entry of the ingress node according to the local tunnel forwarding information of the ingress node.

Preferably, the local tunnel forwarding entry of the ingress node includes a first local tunnel forwarding entry of the ingress node and a second local tunnel forwarding entry of the ingress node.

As described in table 1-1, the first tunnel forwarding entry of the ingress node includes the incoming label of the tunnel in the VNE and the global tunnel ID; and as described in table 1-2, the second tunnel forwarding entry of the ingress node includes the global tunnel ID, the local next hop of the ingress node, the local outbound interface identifier of the ingress node, and the internal VNE label that corresponds to the global tunnel ID. Optionally, the global tunnel ID in the first tunnel forwarding entry of the ingress node and the second tunnel forwarding entry of the ingress node can be replaced with a local tunnel ID of the ingress node.

The global tunnel ID or the local tunnel ID is capable of associating the first tunnel forwarding entry of the ingress node with the second tunnel forwarding entry of the ingress node.

According to this method, the first tunnel forwarding entry of the ingress node and the second tunnel forwarding entry of the ingress node can be generated for the node 1-3 shown in FIG. 3 or FIG. 4.

TABLE 1-1

| First tunnel forwarding entry of the ingress node | |
| --- | --- |
| Incoming label of the VNE | Global tunnel ID |

TABLE 1-2

| Second tunnel forwarding entry of the ingress node | | | |
| --- | --- | --- | --- |
| Global tunnel ID | Local next hop | Local outbound interface identifier | Internal VNE label |

When the ingress node receives a tunnel packet that is encapsulated with the incoming label of the VNE, the ingress node queries the first tunnel forwarding entry of the ingress node according to the incoming label of the VNE, and determines the global tunnel ID or the local tunnel ID; and then queries the second tunnel forwarding entry of the ingress node according to the global tunnel ID or the local tunnel ID, so as to determine the local outbound interface identifier and the internal VNE label that corresponds to the global tunnel ID; and the ingress node replaces the incoming label of the VNE in the tunnel packet with the internal VNE label that corresponds to the global tunnel ID, and forwards the tunnel packet that is encapsulated with the internal VNE label that corresponds to the global tunnel ID through a local outbound interface that corresponds to the local outbound interface identifier.

Preferably, the first tunnel forwarding entry of the ingress node is an incoming label map (ILM, Incoming Label Map), and the second tunnel forwarding entry of the ingress node is a next hop label forwarding entry (NHLFE, Next Hop Label Forwarding Entry).

Optionally, another method for generating a local tunnel forwarding entry for the ingress node is as follows:

The active master node sends the tunnel service information and a node status of the ingress node to the ingress node; and the ingress node generates local tunnel forwarding information of the ingress node according to the tunnel service information and the node status of itself, and generates a local tunnel forwarding entry of the ingress node according to the local tunnel forwarding information of the ingress node.

Preferably, the generating a local tunnel forwarding entry of the ingress node specifically includes the following:

The ingress node queries the internal VNE forwarding entry of the ingress node according to the node identifier of the egress node, and determines a local next hop of the ingress node and a local outbound interface identifier of the ingress node;

the ingress node generates the local tunnel forwarding information of the ingress node for itself, where the local tunnel forwarding information of the ingress node includes the incoming label of the tunnel in the VNE, the global tunnel ID, the local next hop of the ingress node, the local outbound interface identifier of the ingress node, and the internal VNE label that corresponds to the global tunnel ID; and the ingress node generates, according to the local tunnel forwarding information of the ingress node, a first tunnel forwarding entry of the ingress node and a second tunnel forwarding entry of the ingress node described in table 1-1 and table 1-2.

Optionally, a method for generating a local tunnel forwarding entry for the egress node is as follows:

The active master node generates local tunnel forwarding information of the egress node for the egress node, where the local tunnel forwarding information of the egress node includes the internal VNE label that corresponds to the global tunnel ID, the global tunnel ID, the next hop of the tunnel in the VNE, the outbound interface identifier of the tunnel in the VNE, and the outgoing label of the tunnel in the VNE; and the active master node sends the local tunnel forwarding information of the egress node to the egress node, so that the egress node generates, according to the local tunnel forwarding information of the egress node, the local tunnel forwarding entry of the egress node.

Preferably, the local tunnel forwarding entry of the egress node includes a first local tunnel forwarding entry of the egress node and a second local tunnel forwarding entry of the egress node.

As described in table 2-1, the first tunnel forwarding entry of the egress node includes the internal VNE label that corresponds to the global tunnel ID and the global tunnel ID; and as described in table 2-2, the second tunnel forwarding entry of the egress node includes the global tunnel ID, the next hop of the tunnel in the VNE, the outbound interface identifier of the tunnel in the VNE, and the outgoing label of the tunnel in the VNE.

Optionally, the global tunnel ID in the first tunnel forwarding entry of the egress node and the second tunnel forwarding entry of the egress node can be replaced with a local tunnel ID of the egress node.

The global tunnel ID or the local tunnel ID is capable of associating the first tunnel forwarding entry of the egress node with the second tunnel forwarding entry of the egress node.

TABLE 2-1

| First tunnel forwarding entry of the egress node | |
| --- | --- |
| Internal VNE label | Global tunnel ID |

TABLE 2-2

| Second tunnel forwarding entry of the egress node | | | |
| --- | --- | --- | --- |
| Global tunnel ID | Next hop of the VNE | Outbound interface identifier of the VNE | Outgoing label of the VNE |

When the egress node receives a tunnel packet that is encapsulated with the internal VNE label, the egress node queries the first tunnel forwarding entry of the egress node according to the internal VNE label in the tunnel packet, and determines the global tunnel ID or the local tunnel ID; and then, the egress node queries the second tunnel forwarding entry of the egress node according to the global tunnel ID or the local tunnel ID, and determines the outbound interface identifier of the tunnel in the VNE and the outgoing label of the tunnel in the VNE; and the egress node replaces the internal VNE label in the tunnel packet with the outgoing label of the tunnel in the VNE, and sends the tunnel packet that is encapsulated with the outgoing label of the tunnel in the VNE to other nodes of the tunnel outside the VNE through an outbound interface that corresponds to the outbound interface identifier of the tunnel in the VNE.

Preferably, in addition to the generating local tunnel forwarding entries for the ingress node and the egress node, the generating local tunnel forwarding entries for the multiple nodes through which the tunnel passes in the VNE further includes generating a local tunnel forwarding entry for an intermediate node.

Optionally, another method for generating a local tunnel forwarding entry for the egress node is as follows:

The active master node sends the tunnel service information and a node status of the egress node to the egress node; and the egress node generates local tunnel forwarding information of the egress node according to the tunnel service information and the node status of itself, and generates a local tunnel forwarding entry of the egress node according to the local tunnel forwarding information of the egress node.

Preferably, the generating a local tunnel forwarding entry of the egress node specifically includes the following:

The egress node generates the local tunnel forwarding information of the egress node for itself, where the local tunnel forwarding information of the egress node includes the internal VNE label that corresponds to the global tunnel ID, the global tunnel ID, the next hop of the tunnel in the VNE, the outbound interface identifier of the tunnel in the VNE, and the outgoing label of the tunnel in the VNE; and the egress node generates, according to the local tunnel forwarding information of the egress node, a first tunnel forwarding entry of the egress node and a second tunnel forwarding entry of the egress node described in table 2-1 and table 2-2.

Optionally, a method for generating a local tunnel forwarding entry for an intermediate node is as follows:

The active master node queries an internal VNE forwarding entry of the intermediate node according to the node identifier of the egress node, and determines a local next hop of the intermediate node and a local outbound interface identifier of the intermediate node;

the active master node generates local tunnel forwarding information of the intermediate node for the intermediate node, where the local tunnel forwarding information of the intermediate node includes the global tunnel ID, the local next hop of the intermediate node, the local outbound interface identifier of the intermediate node, and the internal VNE label that corresponds to the global tunnel ID; and the active master node sends the local tunnel forwarding information of the intermediate node to the intermediate node, so that the intermediate node generates the local tunnel forwarding entry of the intermediate node according to the local tunnel forwarding information of the intermediate node.

Preferably, the local tunnel forwarding entry of the intermediate node includes a first tunnel forwarding entry of the intermediate node and a second local tunnel forwarding entry of the intermediate node.

As described in table 3-1, the first tunnel forwarding entry of the intermediate node includes the internal VNE label that corresponds to the global tunnel ID and the global tunnel ID; and as described in table 3-2, the second tunnel forwarding entry of the intermediate node includes the global tunnel ID, the local next hop of the intermediate node, the local outbound interface identifier of the intermediate node, and the internal VNE label that corresponds to the global tunnel ID.

Optionally, the global tunnel ID in the first tunnel forwarding entry of the intermediate node and the second tunnel forwarding entry of the intermediate node can be replaced with a local tunnel ID of the intermediate node.

The global tunnel ID or the local tunnel ID is capable of associating the first tunnel forwarding entry of the intermediate node with the second tunnel forwarding entry of the intermediate node.

TABLE 3-1

First tunnel forwarding entry of the intermediate node

| Internal VNE label | Global tunnel ID |
|---|---|

TABLE 3-2

Second tunnel forwarding entry of the intermediate node

| Global tunnel ID | Local next hop | Local outbound interface identifier | Internal VNE label |
|---|---|---|---|

Optionally, another method for generating a local tunnel forwarding entry for an intermediate node is as follows:

The active master node sends the tunnel service information and a node status of the intermediate node to the intermediate node; and the intermediate node generates local tunnel forwarding information of the intermediate node according to the tunnel service information and the node status of itself, and generates a local tunnel forwarding entry of the intermediate node according to the local tunnel forwarding information of the intermediate node.

Preferably, the generating a local tunnel forwarding entry of the intermediate node specifically includes the following:

The intermediate node queries the internal VNE forwarding entry of the intermediate node according to the node identifier of the egress node, and determines the local next hop of the intermediate node and the local outbound interface identifier of the intermediate node;

the intermediate node generates the local tunnel forwarding information of the intermediate node for the intermediate node, where the local tunnel forwarding information of the intermediate node includes the global tunnel ID, the local next hop of the intermediate node, the local outbound interface identifier of the intermediate node, and the internal VNE label that corresponds to the global tunnel ID; and the intermediate node generates, according to the local tunnel forwarding information of the intermediate node, a first tunnel forwarding entry of the intermediate node and a second tunnel forwarding entry of the intermediate node described in table 3-1 and table 3-2.

In this embodiment, a virtual cluster network element (VNE) is enabled to support a tunnel function, and in addition, the VNE that includes multiple physical nodes functions as only one device for other devices, thereby simplifying a network structure and facilitating network management.

Figure 5A:
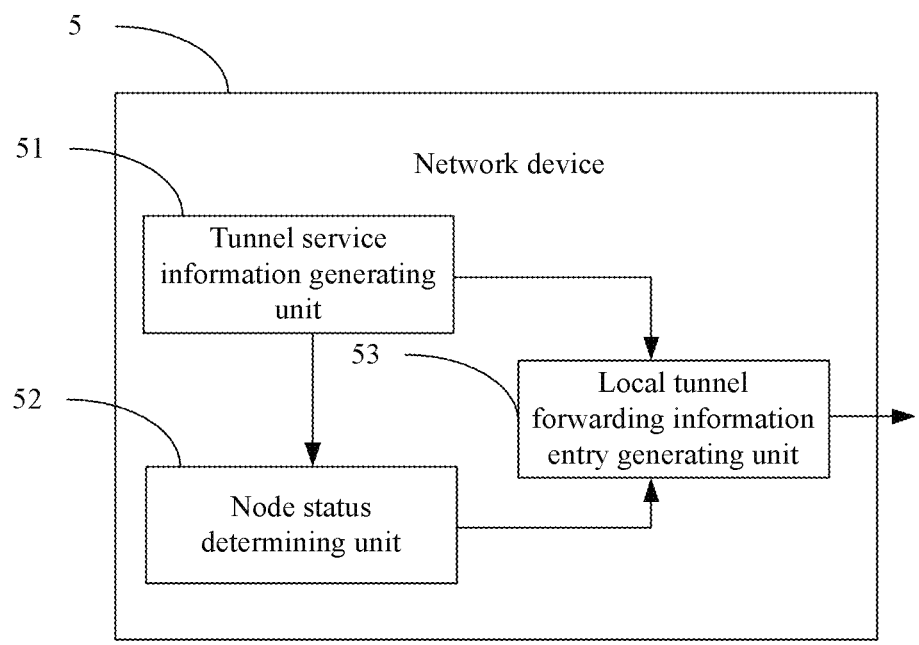
FIG. 5a is a schematic diagram of an apparatus according to an embodiment of the present invention.

An embodiment of the present invention is as follows:

A network device 5 shown in FIG. 5a includes a tunnel service information generating unit 51, a node status determining unit 52, and a local tunnel forwarding information generating unit 53.

Preferably, the network device 5 is a router. A virtual cluster network element (VNE) comprises the network device 5 and one or more other routers in virtual cluster mode. Preferably, the VNE is a single network node in virtual cluster mode, functions as a single network element for other devices on a network, and serves as a provider device, that is, a P device on the network.

The network device 5 is an active master node in the VNE. The VNE includes multiple physical nodes including the network device. However, the VNE is one device in virtual cluster mode, and therefore other nodes outside the VNE regard the VNE as one device on the network.

The tunnel service information generating unit 51 is configured to generate, according to a preconfigured tunnel service, tunnel service information with the virtual cluster network element (VNE) on which the network device is located being a single network element, where the tunnel service information includes an incoming label and an outgoing label of a tunnel in the VNE, an outbound interface identifier of the tunnel in the VNE, a next hop of the tunnel in the VNE, a global tunnel identifier tunnel ID, and an internal VNE label that corresponds to the global tunnel ID. Preferably, the tunnel service information further includes an inbound interface identifier of the tunnel in the VNE.

The node status determining unit 52 is configured to determine multiple nodes through which the tunnel that corresponds to the tunnel service information passes in the VNE, and node statuses of the multiple nodes through which the tunnel passes in the VNE.

The local tunnel forwarding information generating unit 53 is configured to generate, according to the tunnel service information and the node statuses of the multiple nodes through which the tunnel passes in the VNE, local tunnel forwarding information for the multiple nodes through which the tunnel passes in the VNE.

Figure 5B:
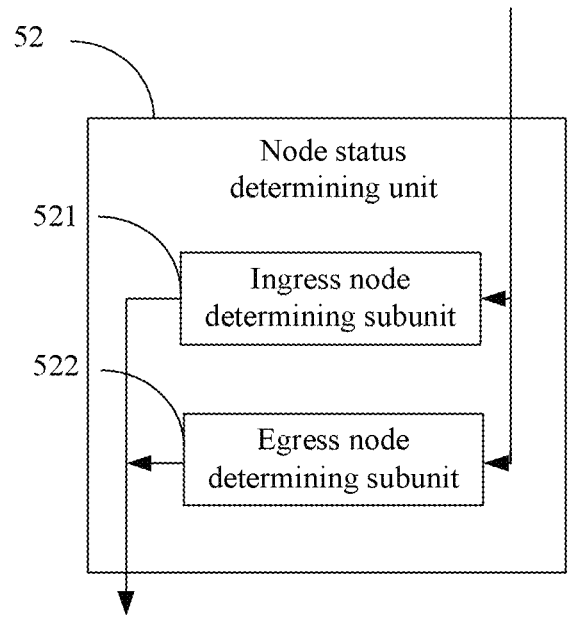
FIG. 5b is a schematic diagram of an apparatus according to an embodiment of the present invention.

As shown in FIG. 5b, in this embodiment, the node status determining unit 52 includes an ingress node determining subunit 521 and an egress node determining subunit 522.

The ingress node determining subunit 521 is configured to determine an ingress node of the tunnel in the VNE according to the inbound interface identifier. The inbound interface identifier carries a node identifier of a node on which an inbound interface is located. Therefore, the ingress node determining subunit is capable of determining the ingress node of the tunnel in the VNE according to the inbound interface identifier.

The egress node determining subunit 522 is configured to determine an egress node of the tunnel in the VNE according to the outbound interface identifier. The outbound interface identifier carries a node identifier of a node on which an outbound interface is located. Therefore, the egress node determining subunit is capable of determining the egress node of the tunnel in the VNE according to the outbound interface identifier.

After the ingress node and the egress node of the tunnel in the VNE are determined, the local tunnel forwarding information generating unit may generate, according to the tunnel service information, local tunnel forwarding information for the ingress node and the egress node.

Figure 5C:
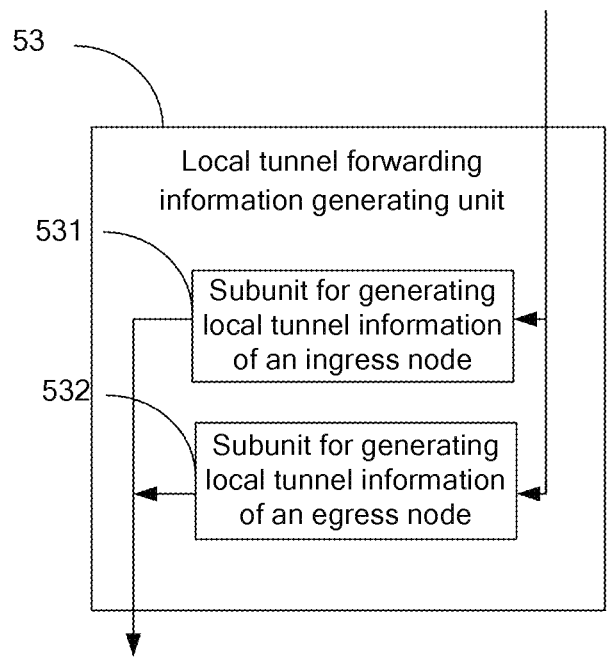
FIG. 5c is a schematic diagram of an apparatus according to an embodiment of the present invention.

As shown in FIG. 5c, the local tunnel forwarding information generating unit 53 includes a subunit 531 for generating local tunnel forwarding information of an ingress node and a subunit 532 for generating local tunnel forwarding information of an egress node.

The subunit 531 for generating local tunnel forwarding information of an ingress node is configured to query an internal VNE forwarding entry of the ingress node according to a node identifier of the egress node, and determine a local next hop of the ingress node and a local outbound interface identifier of the ingress node; and generate local tunnel forwarding information of the ingress node for the ingress node, where the local tunnel forwarding information of the ingress node includes the incoming label of the tunnel in the VNE, the global tunnel ID, a local next hop of an access point, the local outbound interface identifier of the ingress node, and the internal VNE label that corresponds to the global tunnel ID.

The subunit 532 for generating local tunnel forwarding information of an egress node is configured to generate local tunnel forwarding information of the egress node, where the local tunnel forwarding information of the egress node includes the internal VNE label that corresponds to the global tunnel ID, the global tunnel ID, the next hop of the tunnel in the VNE, the outbound interface identifier of the tunnel in the VNE, and the outgoing label of the tunnel in the VNE.

The network device sends the local tunnel forwarding information of the ingress node and the local tunnel forwarding information of the egress node to the ingress node and the egress node in the VNE, respectively. The ingress node and the egress node generate local tunnel forwarding entries according to respective local tunnel forwarding information, so as to guide forwarding of a tunnel packet.

The tunnel may also include an intermediate node in the VNE in addition to the ingress node and the egress node.

Preferably, the node status determining unit further includes an intermediate node determining subunit. The intermediate node determining subunit is configured to take the node identifier of the egress node as a destination identifier to query the internal VNE forwarding entry of the ingress node and determine a next hop that corresponds to the node identifier of the egress node; determine, according to the next hop that corresponds to the node identifier of the egress node, an interface identifier of a node that is connected to the ingress node; determine, according to the interface identifier of the node that is connected to the ingress node, a node identifier of the node that is connected to the ingress node; determine that the node identifier of the node that is connected to the ingress node is different from the node identifier of the egress node; and determine that the node that is connected to the ingress node is an intermediate node of the tunnel in the VNE.

After the intermediate node is determined, local tunnel forwarding information further needs to be generated for the intermediate node.

Preferably, the local tunnel forwarding information generating unit further includes a subunit for generating local tunnel forwarding information of an intermediate node. The subunit for generating local tunnel forwarding information of an intermediate node is configured to query an internal VNE forwarding entry of the intermediate node according to a node identifier of the intermediate node, and determine a local next hop of the intermediate node and a local outbound interface identifier of the intermediate node; and generate local tunnel forwarding information of the intermediate node for the intermediate node, where the local tunnel forwarding information of the intermediate node includes the internal VNE label that corresponds to the global tunnel ID, the global tunnel ID, the local next hop of the intermediate node, and the local outbound interface identifier of the intermediate node.

The network device sends the local tunnel forwarding information of the intermediate node to the intermediate node. The intermediate node generates, according to the local tunnel forwarding information of the intermediate node, a tunnel forwarding entry of the intermediate node at the local to instruct the intermediate node to forward the tunnel packet.

The local tunnel forwarding information of the ingress node, the local tunnel forwarding information of the egress node, and the local tunnel forwarding information of the intermediate node that are generated by the network device have respectively and directly included information required for generating a local tunnel forwarding entry of the ingress node, a local tunnel forwarding entry of the egress node, and a local tunnel forwarding entry of the intermediate node. Therefore, the ingress node, the egress node, and the intermediate node may directly fill the respective local tunnel forwarding information in the respective local tunnel forwarding entries, so as to generate valid local tunnel forwarding entries.

In this embodiment, the network device can enable a virtual cluster network element (VNE) to support a tunnel function, and in addition, the VNE that includes multiple physical nodes functions as only one device for other devices, thereby simplifying a network structure and facilitating network management.

Figure 6A:
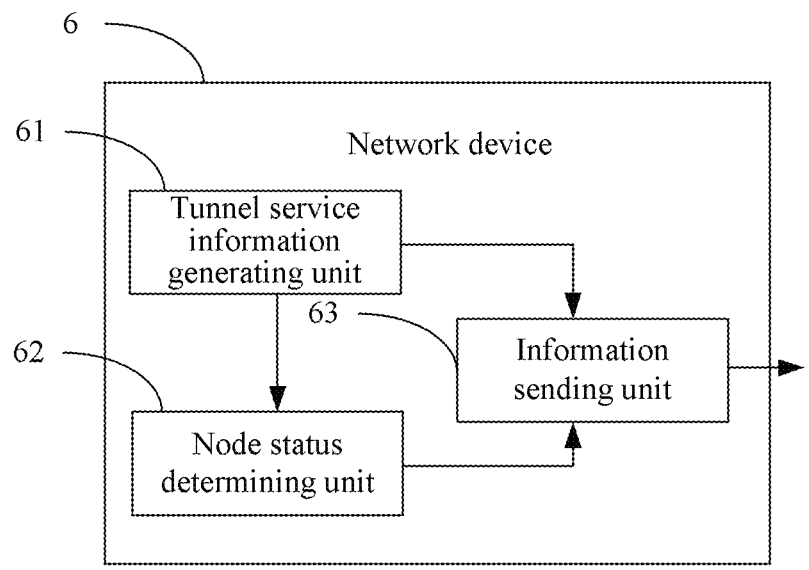
FIG. 6a is a schematic diagram of an apparatus according to an embodiment of the present invention.

An embodiment of the present invention is as follows:

A network device 6 shown in FIG. 6a includes a tunnel service information generating unit 61, a node status determining unit 62, and an information sending unit 63.

Preferably, the network device 6 is a router. A virtual cluster network element (VNE) comprises the network device 6 and one or more other routers in virtual cluster mode. Preferably, the VNE is a single network node in virtual cluster mode, functions as a single network element for other devices on a network, and serves as a provider device, that is, a P device on the network. The network device is an active master node in the VNE. The VNE includes multiple physical nodes including the network device. However, the VNE is one device in virtual cluster mode, and therefore other nodes outside the VNE regard the VNE as one device on the network.

The network device 6 includes the tunnel service information generating unit 61, the node status determining unit 62, and the information sending unit 63.

The tunnel service information generating unit 61 is configured to generate, according to a preconfigured tunnel service, tunnel service information with the virtual cluster network element (VNE) on which the network device is located being a single network element, where the tunnel service information includes an incoming label and an outgoing label of a tunnel in the VNE, an outbound interface identifier of the tunnel in the VNE, a next hop of the tunnel in the VNE, a global tunnel identifier tunnel ID, and an internal VNE label that corresponds to the global tunnel ID. Preferably, the tunnel service information further includes an inbound interface identifier of the tunnel in the VNE.

The node status determining unit 62 is configured to determine multiple nodes through which the tunnel that corresponds to the tunnel service information passes in the VNE, and node statuses of the multiple nodes through which the tunnel passes in the VNE.

The information sending unit 63 is configured to send the tunnel service information to the multiple nodes through which the tunnel passes in the VNE, and send the node statuses of the multiple nodes themselves to each of the multiple nodes through which the tunnel passes in the VNE.

Figure 6B:
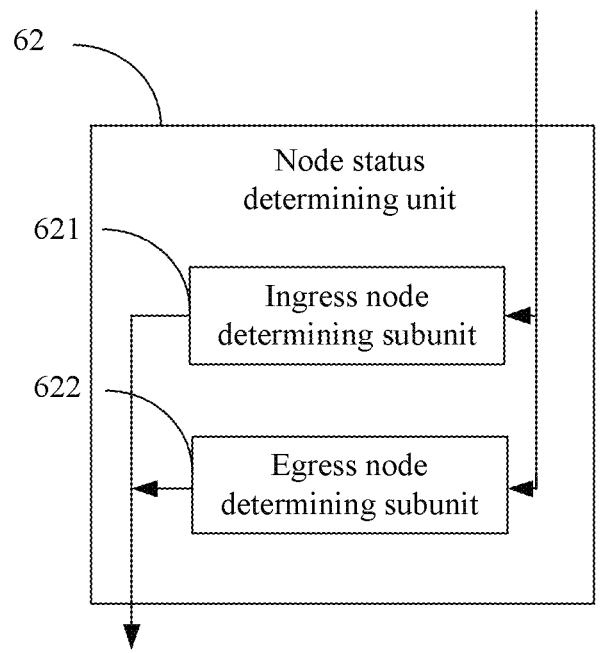
FIG. 6b is a schematic diagram of an apparatus according to an embodiment of the present invention.

As shown in FIG. 6b, in this embodiment, the node status determining unit 62 includes an ingress node determining subunit 621 and an egress node determining subunit 622.

The ingress node determining subunit 621 is configured to determine an ingress node of the tunnel in the VNE according to the inbound interface identifier. The inbound interface identifier carries a node identifier of a node on which an inbound interface is located. Therefore, the ingress node determining subunit is capable of determining the ingress node of the tunnel in the VNE according to the inbound interface identifier.

The egress node determining subunit 622 is configured to determine an egress node of the tunnel in the VNE according to the outbound interface identifier. The outbound interface identifier carries a node identifier of a node on which an outbound interface is located. Therefore, the egress node determining subunit is capable of determining the egress node of the tunnel in the VNE according to the outbound interface identifier.

In this way, the information sending unit 63 is capable of sending the tunnel service information to the ingress node and the egress node, and sending a node status of the ingress node and that of the egress node to the ingress node and the egress node respectively, so that the ingress node and the egress node determine the node statuses of themselves. The ingress node and the egress node further generate, according to the node statuses of themselves and tunnel status information, a local tunnel forwarding entry of the ingress node and a local tunnel forwarding entry of the egress node for themselves, so as to guide forwarding of a tunnel packet.

The tunnel may also include an intermediate node in the VNE in addition to the ingress node and the egress node.

Preferably, an intermediate node determining subunit is configured to take a node identifier of the egress node as a destination identifier to query an internal VNE forwarding entry of the ingress node and determine a next hop that corresponds to the node identifier of the egress node; determine, according to the next hop that corresponds to the node identifier of the egress node, an interface identifier of a node that is connected to the ingress node; determine, according to the interface identifier of the node that is connected to the ingress node, a node identifier of the node that is connected to the ingress node; determine that the node identifier of the node that is connected to the ingress node is different from the node identifier of the egress node; and determine that the node that is connected to the ingress node is an intermediate node of the tunnel in the VNE.

In this way, the network device is capable of sending the tunnel service information to the intermediate node, and sending a node status of the intermediate node to the intermediate node, so that the intermediate node determines the status of itself. The intermediate node further generates, according to the node status of itself and the tunnel service information, a tunnel local forwarding entry of the intermediate node, so as to guide forwarding of the tunnel packet.

In this embodiment, the network device can enable a virtual cluster network element (VNE) to support a tunnel function, and in addition, the VNE that includes multiple physical nodes functions as only one device for other devices, thereby simplifying a network structure and facilitating network management.

Figure 7:
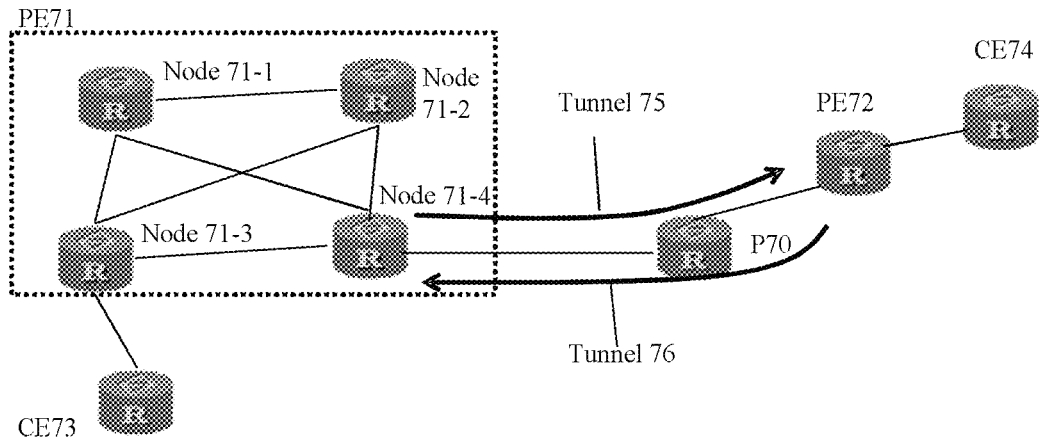
FIG. 7 is a schematic diagram of a network according to an embodiment of the present invention.

An embodiment of the present invention is as follows:

On a network shown in FIG. 7, a virtual cluster network element (VNE) includes multiple physical nodes, and preferably, the physical nodes are routers or switches. The VNE is a network element comprises multiple hardware devices in virtual cluster mode, and the VNE functions as one device for other devices on the network. As shown in FIG. 7, the VNE is a provider edge (PE) 71 on the network, and the network at least further includes a provider device (P) 70, a provider edge (PE) 72, a customer edge (CE) 73, and a customer edge (CE) 74. Preferably, in the VNE, a node 71-1 is an active master node, a node 71-2 is a standby master node, a node 71-3 is a first slave node, and a node 71-4 is a second slave node. The node 71-4 and the PE 72 in the VNE are taken as two endpoints, and at least one tunnel passes through the P 70. Preferably, the tunnel is a label switching path (LSP) tunnel or a traffic engineering (TE) tunnel. The node 71-3 in the VNE is connected to the node 71-4 and the CE 73. Optionally, the active master node may be any one of the nodes in the VNE.

Figure 8:
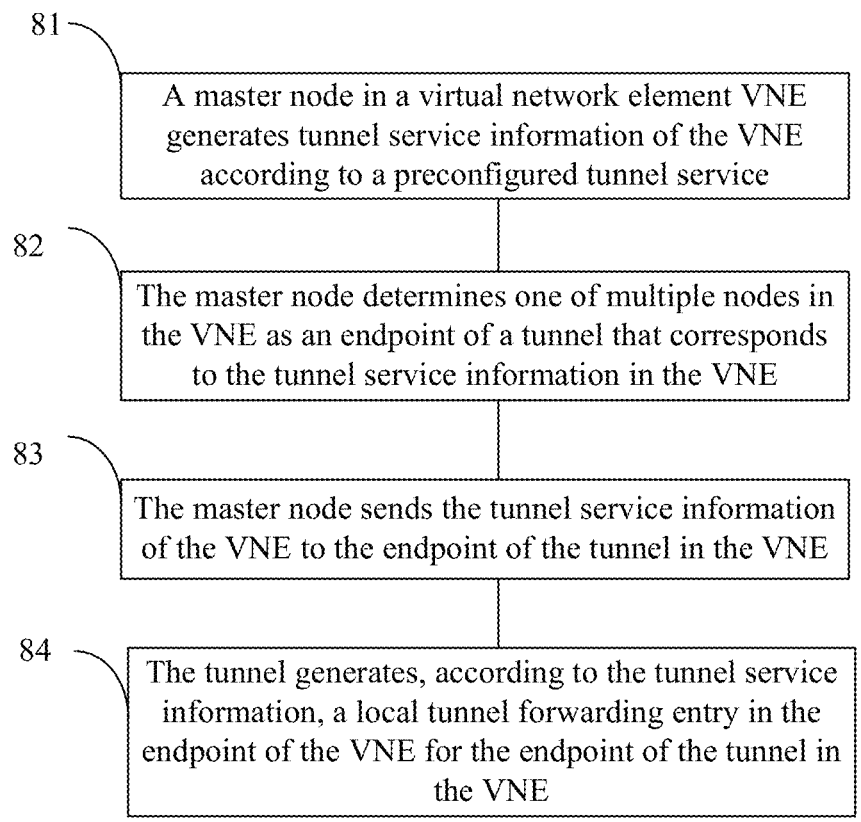
FIG. 8 is a flowchart of a method according to an embodiment of the present invention.

As shown in FIG. 8, a method for generating a tunnel forwarding entry is as follows:

81. The active master node in the virtual cluster network element (VNE) generates, according to a preconfigured tunnel service, tunnel service information with the VNE being a single network element.

Optionally, the tunnel service information includes an outgoing label of the tunnel in the VNE, an outbound interface identifier of the tunnel in the VNE, a global tunnel identifier tunnel ID, and an IP address of a peer endpoint of the tunnel that corresponds to the tunnel service information outside the VNE. The global tunnel ID indicates a global tunnel ID among all nodes in the VNE.

Optionally, the tunnel service information includes an inbound interface identifier of the tunnel in the VNE and an incoming label of the tunnel in the VNE.

Preferably, pre-configuration of the tunnel service may be implemented in a static pre-configuration manner or a dynamic pre-configuration manner.

82. The active master node determines one of multiple nodes in the VNE as an endpoint of the tunnel that corresponds to the tunnel service information in the VNE.

Optionally, the active master node determines, according to a node identifier of a node on which a VNE outbound interface is located, the node identifier being carried in the outbound interface identifier of the VNE, one of the multiple nodes included in the VNE as the endpoint of the tunnel that corresponds to the tunnel service information in the VNE. A node that corresponds to the node identifier of the node on which the VNE outbound interface is located, the node identifier being carried in the outbound interface identifier of the VNE, is the endpoint of the tunnel in the VNE and is also an ingress node (Ingress node) of the tunnel.

As shown in FIG. 7, when the node identifier of the node on which the VNE outbound interface is located, the node identifier being carried in the outbound interface identifier of the VNE, is a node identifier of the node 71-4, it is determined that the node 71-4 is a start point of a tunnel that takes the PE 71 as a start point and the PE 72 as an end point, that is, an ingress node (Ingress node) of a tunnel 75.

Optionally, the active master node determines, according to a node identifier of a node on which a VNE inbound interface is located, the node identifier being carried in the inbound interface identifier of the VNE, one of the multiple nodes included in the VNE as the endpoint of the tunnel that corresponds to the tunnel service information in the VNE. A node that corresponds to the node identifier of the node on which the VNE inbound interface is located, the node identifier being carried in the inbound interface identifier of the VNE, is the endpoint of the tunnel in the VNE and is also an egress node (Egress node) of the tunnel.

As shown in FIG. 7, when the node identifier of the node on which the VNE inbound interface is located, the node identifier being carried in the inbound interface identifier of the VNE, is the node identifier of the node 71-4, it is determined that the node 71-4 is an end point of a tunnel that takes the PE 72 as a start point and the PE 71 as an end point, that is, an egress node (Egress node) of a tunnel 76.

83. The active master node sends the tunnel service information to the endpoint of the tunnel in the VNE.

Preferably, the method further includes the following content:

84. The endpoint of the tunnel in the VNE generates, according to the tunnel service information, a local tunnel forwarding entry for the endpoint of the tunnel in the VNE.

An optional and more detailed implementation is as follows:

The endpoint of the tunnel in the VNE, such as the ingress node of the tunnel, receives the tunnel service information, where the tunnel service information includes the outgoing label of the tunnel in the VNE, the outbound interface identifier of the tunnel in the VNE, the global tunnel identifier tunnel ID, and the IP address of the peer endpoint of the tunnel that corresponds to the tunnel service information outside the VNE. Preferably, the egress node of the tunnel is the ingress node of the tunnel 75 on the network shown in FIG. 7, that is, the node 71-4.

The endpoint of the tunnel in the VNE generates a local tunnel forwarding entry of the ingress node, where the local tunnel forwarding entry of the ingress node includes a first tunnel forwarding entry of the ingress node and a second tunnel forwarding entry of the ingress node, the first tunnel forwarding entry of the ingress node includes: the IP address of the peer endpoint of the tunnel outside the VNE, a next hop of the VNE in the tunnel, the outbound interface identifier of the tunnel in the VNE, and the global tunnel ID, and the second tunnel forwarding entry of the ingress node includes: the global tunnel ID, the outbound interface identifier of the tunnel in the VNE, the outgoing label of the tunnel in the VNE, the next hop of the tunnel in the VNE, and a label action with action content of pushing a label.

The first tunnel forwarding entry of the ingress node and the second tunnel forwarding entry of the ingress node are associated by using the global tunnel ID.

Preferably, a node in the VNE other than the endpoint of the tunnel in the VNE sets a tunnel ID field in a forwarding information base of itself to an invalid value.

Another optional and more detailed implementation is as follows:

The endpoint of the tunnel in the VNE, such as the egress node of the tunnel, receives the tunnel service information, where the tunnel service information includes the inbound interface identifier of the tunnel in the VNE and an inbound interface of the tunnel in the VNE. Preferably, the egress node of the tunnel is the egress node of the tunnel 76 on the network shown in FIG. 7, that is, the node 71-4.

The endpoint of the tunnel in the VNE generates a local tunnel forwarding entry of the egress node, where the local tunnel forwarding entry of the egress node includes the incoming label of the tunnel in the VNE and the inbound interface identifier of the tunnel in the VNE, and preferably, further includes a label action with action content of popping the label.

In this embodiment, a virtual cluster network element (VNE) is enabled to support a tunnel function, and in addition, the VNE that includes multiple physical nodes functions as only one device for other devices, thereby simplifying a network structure and facilitating network management.

Figure 9A:
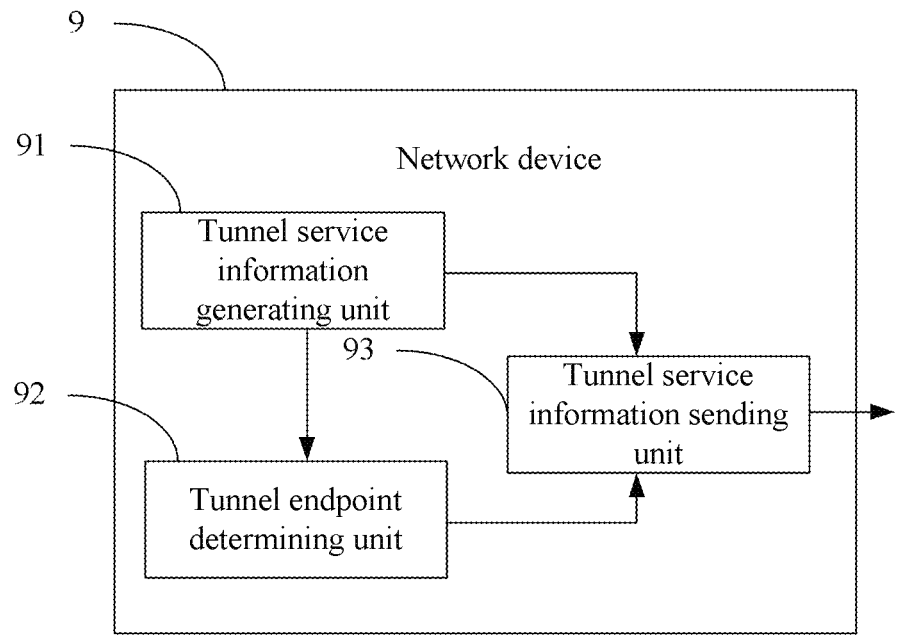
FIG. 9a is a schematic diagram of an apparatus according to an embodiment of the present invention.

An embodiment of the present invention is as follows:

A network device 9 shown in FIG. 9a includes a tunnel service information generating unit 91, a tunnel endpoint determining unit 92, and a tunnel service information sending unit 93.

Preferably, the network device 9 is a router. A virtual cluster network element (VNE) comprises the network device 9 and at least one other routers in virtual cluster mode. Preferably, the VNE performs work of a provider edge, that is, a PE device on the network. The network device 9 is an active master node in the VNE. The VNE includes multiple physical nodes including the network device. However, the VNE is one device in virtual cluster mode, and therefore other nodes outside the VNE regard the VNE as one device on the network.

The tunnel service information generating unit 91 is configured to generate, according to a preconfigured tunnel service, tunnel service information with the VNE being a single network element, where the tunnel service information includes an outgoing label of a tunnel in the VNE, an outbound interface identifier of the tunnel in the VNE, a global tunnel identifier tunnel ID, and an IP address of an endpoint of the tunnel that corresponds to the tunnel service information outside the VNE, or the tunnel service information includes an inbound interface identifier of the tunnel in the VNE and an incoming label of the tunnel in the VNE.

The tunnel endpoint determining unit 92 is configured to determine one of multiple nodes in the VNE as an endpoint of the tunnel that corresponds to the tunnel service information in the VNE.

The tunnel service information sending unit 93 is configured to send the tunnel service information to the endpoint of the tunnel in the VNE.

Figure 9B:
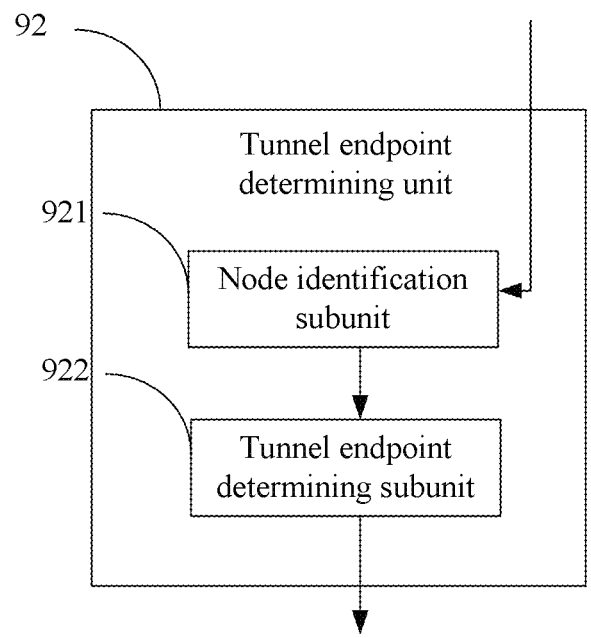
FIG. 9b is a schematic diagram of an apparatus according to an embodiment of the present invention.

Preferably, as shown in FIG. 9*b*, the tunnel endpoint determining unit includes:

a node identifier determining subunit 921, configured to determine a node identifier of a node on which an inbound interface is located, the node identifier being carried in the inbound interface identifier, or a node identifier of a node on which an outbound interface is located, the node identifier being carried in the outbound interface identifier; and a tunnel endpoint determining subunit 922, configured to determine, according to the node identifier, one of the multiple nodes in the VNE as the endpoint of the tunnel that corresponds to the tunnel service information in the VNE.

When the network device 9 sends the tunnel service information to the endpoint of the tunnel in the VNE, the endpoint of the tunnel in the VNE may generate a local tunnel forwarding entry according to the tunnel service information.

In this embodiment, the network device can enable a virtual cluster network element (VNE) to support a tunnel function, and in addition, the VNE that includes multiple physical nodes functions as only one device for other devices, thereby simplifying a network structure and facilitating network management.

Persons of ordinary skill in the art may understand that all or part of the steps of the methods in the embodiments may be implemented by a program instructing relevant hardware. The program may be stored in a computer readable storage medium. When the program is run, the steps of the methods in the embodiments are performed. The storage medium includes any medium that is capable of storing program codes, such as a ROM, a RAM, a magnetic disk, or an optical disk.

Finally, it should be noted that the foregoing embodiments are merely intended to describe the technical solutions of the embodiments of the present invention rather than limiting the present invention. Although the embodiments of the present invention are described in detail with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of corresponding technical solutions to depart from the scope of the technical solutions of the embodiments of the present invention.

What is claimed is:

1. A method for generating a tunnel forwarding entry, comprising:

generating, by an active master node in a virtual cluster network element VNE, according to a preconfigured tunnel service, tunnel service information with the VNE being a single network element, wherein the tunnel service information comprises an incoming label and an outgoing label of a tunnel in the VNE, an outbound interface identifier of the tunnel in the VNE, a next hop of the tunnel in the VNE, a global tunnel identifier tunnel ID, and an internal VNE label that corresponds to the global tunnel ID, wherein the VNE serves as a provider device on a network, and functions as a single network element for other devices on the network;

determining, by the active master node, multiple nodes through which the tunnel that corresponds to the tunnel service information passes in the VNE, and node statuses of the multiple nodes through which the tunnel passes in the VNE; and generating, according to the tunnel service information and the node statuses of the multiple nodes through which the tunnel passes in the VNE, local tunnel forwarding entries for the multiple nodes through which the tunnel passes in the VNE.

2. The method according to claim 1, wherein each of the multiple nodes in the VNE maintains an internal VNE forwarding entry from itself to the other nodes among the multiple nodes, the internal VNE forwarding entry comprises a destination node identifier, an outbound interface identifier that corresponds to the destination node identifier, and next hop information, and the active master node acquires all the internal VNE forwarding entries.

3. The method according to claim 2, wherein the determining, by the active master node, multiple nodes through which the tunnel that corresponds to the tunnel service information passes in the VNE, and node statuses of the multiple nodes through which the tunnel passes in the VNE comprises:

determining, by the active master node, an ingress node and an egress node of the tunnel in the VNE according to an inbound interface identifier and the outbound interface identifier of the tunnel in the VNE, respectively.

4. A method for generating a tunnel forwarding entry, comprising:

generating, by an active master node in a virtual cluster network element VNE, according to a preconfigured tunnel service, tunnel service information with the VNE being a single network element, wherein the tunnel service information comprises an incoming label and an outgoing label of a tunnel in the VNE, an outbound interface identifier of the tunnel in the VNE, a next hop of the tunnel in the VNE, a global tunnel identifier tunnel ID, and an internal VNE label that corresponds to the global tunnel ID;

determining, by the active master node, multiple nodes through which the tunnel that corresponds to the tunnel service information passes in the VNE, and node statuses of the multiple nodes through which the tunnel passes in the VNE; and generating, according to the tunnel service information and the node statuses of the multiple nodes through which the tunnel passes in the VNE, local tunnel forwarding entries for the multiple nodes through which the tunnel passes in the VNE, wherein each of the multiple nodes in the VNE maintains an internal VNE forwarding entry from itself to the other nodes among the multiple nodes, the internal VNE forwarding entry comprises a destination node identifier, an outbound interface identifier that corresponds to the destination node identifier, and next hop information, and the active master node acquires all the internal VNE forwarding entries, wherein the determining, by the active master node, multiple nodes through which the tunnel that corresponds to the tunnel service information passes in the VNE, and node statuses of the multiple nodes through which the tunnel passes in the VNE comprises:

determining, by the active master node, an ingress node and an egress node of the tunnel in the VNE according to an inbound interface identifier and the outbound interface identifier of the tunnel in the VNE, respectively, and wherein the generating, according to the tunnel service information and the node statuses of the multiple nodes through which the tunnel passes in the VNE, local tunnel forwarding entries for the multiple nodes through which the tunnel passes in the VNE comprises generating a local tunnel forwarding entry of the ingress node for the ingress node and a local tunnel forwarding entry of the egress node for the egress node;

the generating a local tunnel forwarding entry of the ingress node for the ingress node comprises:

querying, by the active master node, an internal VNE forwarding entry of the ingress node according to a node identifier of the egress node, and determining a local next hop of the ingress node and a local outbound interface identifier of the ingress node;

generating, by the active master node, local tunnel forwarding information of the ingress node for the ingress node, wherein the local tunnel forwarding information of the ingress node comprises the incoming label of the tunnel in the VNE, the global tunnel ID, the local next hop of the ingress node, the local outbound interface identifier of the ingress node, and the internal VNE label that corresponds to the global tunnel ID; and sending, by the active master node, the local tunnel forwarding information of the ingress node to the ingress node, so that the ingress node generates, according to the local tunnel forwarding information of the ingress node, the local tunnel forwarding entry of the ingress node; and the generating a local tunnel forwarding entry of the egress node for the egress node comprises:

generating, by the active master node, local tunnel forwarding information of the egress node for the egress node, wherein the local tunnel forwarding information of the egress node comprises the internal VNE label that corresponds to the global tunnel ID, the global tunnel ID, the next hop of the tunnel in the VNE, the outbound interface identifier of the tunnel in the VNE, and the outgoing label of the tunnel in the VNE; and sending, by the active master node, the local tunnel forwarding information of the egress node to the egress node, so that the egress node generates, according to the local tunnel forwarding information of the egress node, the local tunnel forwarding entry of the egress node.

5. A method for generating a tunnel forwarding entry, comprising:

generating, by an active master node in a virtual cluster network element VNE, according to a preconfigured tunnel service, tunnel service information with the VNE being a single network element, wherein the tunnel service information comprises an incoming label and an outgoing label of a tunnel in the VNE, an outbound interface identifier of the tunnel in the VNE, a next hop of the tunnel in the VNE, a global tunnel identifier tunnel ID, and an internal VNE label that corresponds to the global tunnel ID;

determining, by the active master node, multiple nodes through which the tunnel that corresponds to the tunnel service information passes in the VNE, and node statuses of the multiple nodes through which the tunnel passes in the VNE; and generating, according to the tunnel service information and the node statuses of the multiple nodes through which the tunnel passes in the VNE, local tunnel forwarding entries for the multiple nodes through which the tunnel passes in the VNE, wherein each of the multiple nodes in the VNE maintains an internal VNE forwarding entry from itself to the other nodes among the multiple nodes, the internal VNE forwarding entry comprises a destination node identifier, an outbound interface identifier that corresponds to the destination node identifier, and next hop information, and the active master node acquires all the internal VNE forwarding entries, wherein the determining, by the active master node, multiple nodes through which the tunnel that corresponds to the tunnel service information passes in the VNE, and node statuses of the multiple nodes through which the tunnel passes in the VNE comprises:

determining, by the active master node, an ingress node and an egress node of the tunnel in the VNE according to an inbound interface identifier and the outbound interface identifier of the tunnel in the VNE, respectively, and wherein the generating, according to the tunnel service information and the node statuses of the multiple nodes through which the tunnel passes in the VNE, local tunnel forwarding entries for the multiple nodes through which the tunnel passes in the VNE comprises generating a local tunnel forwarding entry of the ingress node for the ingress node and a local tunnel forwarding entry of the egress node for the egress node;

the generating a local tunnel forwarding entry of the ingress node for the ingress node comprises:

sending, by the active master node, the tunnel service information and a node status of the ingress node to the ingress node; and generating, by the ingress node, local tunnel forwarding information of the ingress node according to the tunnel service information and the node status of itself, and generating the local tunnel forwarding entry of the ingress node according to the local tunnel forwarding information of the ingress node; and the generating a local tunnel forwarding entry of the egress node for the egress node comprises:

sending, by the active master node, the tunnel service information and a node status of the egress node to the egress node; and generating, by the egress node, local tunnel forwarding information of the egress node according to the tunnel service information and the node status of itself, and generating the local tunnel forwarding entry of the egress node according to the local tunnel forwarding information of the egress node.

6. A method for generating a tunnel forwarding entry, comprising:

generating, by an active master node in a virtual cluster network element VNE, according to a preconfigured tunnel service, tunnel service information with the VNE being a single network element, wherein the tunnel service information comprises an incoming label and an outgoing label of a tunnel in the VNE, an outbound interface identifier of the tunnel in the VNE, a next hop of the tunnel in the VNE, a global tunnel identifier tunnel ID, and an internal VNE label that corresponds to the global tunnel ID;

determining, by the active master node, multiple nodes through which the tunnel that corresponds to the tunnel service information passes in the VNE, and node statuses of the multiple nodes through which the tunnel passes in the VNE; and generating, according to the tunnel service information and the node statuses of the multiple nodes through which the tunnel passes in the VNE, local tunnel forwarding entries for the multiple nodes through which the tunnel passes in the VNE, wherein each of the multiple nodes in the VNE maintains an internal VNE forwarding entry from itself to the other nodes among the multiple nodes, the internal VNE forwarding entry comprises a destination node identifier, an outbound interface identifier that corresponds to the destination node identifier, and next hop information, and the active master node acquires all the internal VNE forwarding entries, wherein the determining, by the active master node, multiple nodes through which the tunnel that corresponds to the tunnel service information passes in the VNE, and node statuses of the multiple nodes through which the tunnel passes in the VNE comprises:

determining, by the active master node, an ingress node and an egress node of the tunnel in the VNE according to an inbound interface identifier and the outbound interface identifier of the tunnel in the VNE, respectively, and wherein the method further comprises:

taking, by the active master node, a node identifier of the egress node as a destination identifier to query an internal VNE forwarding entry of the ingress node and determine a next hop that corresponds to the node identifier of the egress node;

determining, according to the next hop that corresponds to the node identifier of the egress node, an interface identifier of a node that is connected to the ingress node;

determining, according to the interface identifier of the node that is connected to the ingress node, a node identifier of the node that is connected to the ingress node;

determining that the node identifier of the node that is connected to the ingress node is different from the node identifier of the egress node; and determining that the node that is connected to the ingress node is an intermediate node of the tunnel in the VNE.

7. The method according to claim 6, wherein the generating, according to the tunnel service information and the node statuses of the multiple nodes through which the tunnel passes in the VNE, local tunnel forwarding entries for the multiple nodes through which the tunnel passes in the VNE further comprises generating a local tunnel forwarding entry of the ingress node for the intermediate node; and the generating a local tunnel forwarding entry of the ingress node for the intermediate node comprises:

querying, by the active master node, an internal VNE forwarding entry of the intermediate node according to the node identifier of the egress node, and determining a local next hop of the intermediate node and a local outbound interface identifier of the intermediate node;

generating, by the active master node, local tunnel forwarding information of the intermediate node for the intermediate node, wherein the local tunnel forwarding information of the intermediate node comprises the global tunnel ID, the local next hop of the intermediate node, the local outbound interface identifier of the intermediate node, and the internal VNE label that corresponds to the global tunnel ID; and sending, by the active master node, the local tunnel forwarding information of the intermediate node to the intermediate node, so that the intermediate node generates, according to the local tunnel forwarding information of the intermediate node, the local tunnel forwarding entry of the intermediate node; or the generating a local tunnel forwarding entry of the ingress node for the intermediate node comprises:

sending, by the active master node, the tunnel service information and a node status of the intermediate node to the intermediate node; and generating, by the intermediate node, local tunnel forwarding information of the intermediate node according to the tunnel service information and the node status of itself, and generating the local tunnel forwarding entry of the intermediate node according to the local tunnel forwarding information of intermediate node.

8. The method according to claim 1, wherein the tunnel is a label switching path LSP tunnel or a traffic engineering TE tunnel.

9. A network device, comprising:

a non-transitory computer readable storage medium to store programs, and computer hardware configured to implement, including configured by the programs to implement:

a tunnel service information generating unit, configured to generate, according to a preconfigured tunnel service, tunnel service information with a virtual cluster network element VNE on which the network device is located being a single network element, wherein the tunnel service information comprises an incoming label and an outgoing label of a tunnel in the VNE, an inbound interface identifier and an outbound interface identifier of the tunnel in the VNE, a next hop of the tunnel in the VNE, a global tunnel identifier tunnel ID, and an internal VNE label that corresponds to the global tunnel ID, wherein the VNE serves as a provider device on a network, and functions as a single network element for other devices on the network;

a node status determining unit, configured to determine multiple nodes through which the tunnel that corresponds to the tunnel service information passes in the VNE, and node statuses of the multiple nodes through which the tunnel passes in the VNE; and a local tunnel forwarding information generating unit, configured to generate, according to the tunnel service information and the node statuses of the multiple nodes through which the tunnel passes in the VNE, local tunnel forwarding information for the multiple nodes through which the tunnel passes in the VNE.

10. The network device according to claim 9, wherein the node status determining unit comprises:

an ingress node determining subunit, configured to determine an ingress node of the tunnel in the VNE according to the inbound interface identifier; and an egress node determining subunit, configured to determine an egress node of the tunnel in the VNE according to the outbound interface identifier.

11. The network device according to claim 10, wherein the local tunnel forwarding information generating unit comprises: a subunit for generating local tunnel forwarding information of the ingress node and a subunit for generating local tunnel forwarding information of the egress node;

the subunit for generating local tunnel forwarding information of the ingress node is configured to query an internal VNE forwarding entry of the ingress node according to a node identifier of the egress node, and determine a local next hop of the ingress node and a local outbound interface identifier of the ingress node; and generate local tunnel forwarding information of the ingress node for the ingress node, wherein the local tunnel forwarding information of the ingress node comprises the incoming label of the tunnel in the VNE, the global tunnel ID, a local next hop of an access point, the local outbound interface identifier of the ingress node, and the internal VNE label that corresponds to the global tunnel ID; and the subunit for generating local tunnel forwarding information of the egress node is configured to generate local tunnel forwarding information of the egress node, wherein the local tunnel forwarding information of the egress node comprises the internal VNE label that corresponds to the global tunnel ID, the global tunnel ID, the next hop of the tunnel in the VNE, the outbound interface identifier of the tunnel in the VNE, and the outgoing label of the tunnel in the VNE.

12. The network device according to claim 10, wherein the node status determining unit further comprises:

an intermediate node determining subunit, configured to take a node identifier of the egress node as a destination identifier to query an internal VNE forwarding entry of the ingress node and determine a next hop that corresponds to the node identifier of the egress node; determine, according to the next hop that corresponds to the node identifier of the egress node, an interface identifier of a node that is connected to the ingress node; determine, according to the interface identifier of the node that is connected to the ingress node, a node identifier of the node that is connected to the ingress node; determine that the node identifier of the node that is connected to the ingress node is different from the node identifier of the egress node; and determine that the node that is connected to the ingress node is an intermediate node of the tunnel in the VNE.

13. The network device according to claim 12, wherein the local tunnel forwarding information generating unit comprises:

a subunit for generating local tunnel forwarding information of the intermediate node, configured to query an internal VNE forwarding entry of the intermediate node according to a node identifier of the intermediate node, and determine a local next hop of the intermediate node and a local outbound interface identifier of the intermediate node; and generate local tunnel forwarding information of the intermediate node for the intermediate node, wherein the local tunnel forwarding information of the intermediate node comprises the internal VNE label that corresponds to the global tunnel ID, the global tunnel ID, the local next hop of the intermediate node, and the local outbound interface identifier of the intermediate node.

14. A network device, comprising:

a non-transitory computer readable storage medium to store programs, and computer hardware configured to implement, including configured by the programs to implement:

a tunnel service information generating unit, configured to generate, according to a preconfigured tunnel service, tunnel service information with a virtual cluster network element VNE on which the network device is located being a single network element, wherein the tunnel service information comprises an incoming label and an outgoing label of a tunnel in the VNE, an inbound interface identifier and an outbound interface identifier of the tunnel in the VNE, a global tunnel identifier tunnel ID, and an internal VNE label that corresponds to the global tunnel ID, wherein the VNE serves as a provider device on a network, and functions as a single network element for other devices on the network;

a node status determining unit, configured to determine multiple nodes through which the tunnel that corresponds to the tunnel service information passes in the VNE, and node statuses of the multiple nodes through which the tunnel passes in the VNE; and an information sending unit, configured to send the tunnel service information to the multiple nodes through which the tunnel passes in the VNE, and send the node statuses of the multiple nodes themselves to each of the multiple nodes through which the tunnel passes in the VNE.

15. The network device according to claim 14, wherein the node status determining unit comprises:

an ingress node determining subunit, configured to determine an ingress node of the tunnel in the VNE according to the inbound interface identifier; and an egress node determining subunit, configured to determine an egress node of the tunnel in the VNE according to the outbound interface identifier.

16. The network device according to claim 15, wherein the node status determining unit further comprises:

an intermediate node determining subunit, configured to take a node identifier of the egress node as a destination identifier to query an internal VNE forwarding entry of the ingress node and determine a next hop that corresponds to the node identifier of the egress node; determine, according to the next hop that corresponds to the node identifier of the egress node, an interface identifier of a node that is connected to the ingress node; determine, according to the interface identifier of the node that is connected to the ingress node, a node identifier of the node that is connected to the ingress node; determine that the node identifier of the node that is connected to the ingress node is different from the node identifier of the egress node; and determine that the node that is connected to the ingress node is an intermediate node of the tunnel in the VNE.

17. A method for generating a tunnel forwarding entry, comprising:

generating, by an active master node in a virtual cluster network element VNE, according to a preconfigured tunnel service, tunnel service information with the VNE being a single network element, wherein the tunnel service information comprises an outgoing label of a tunnel in the VNE, an outbound interface identifier of the tunnel in the VNE, a global tunnel identifier tunnel ID, and an IP address of an endpoint of the tunnel that corresponds to the tunnel service information outside the VNE, or the tunnel service information comprises an inbound interface identifier of the tunnel in the VNE and an incoming label of the tunnel in the VNE;

determining, by the active master node, one of multiple nodes in the VNE as an endpoint of the tunnel that corresponds to the tunnel service information in the VNE; and sending, by the active master node, the tunnel service information to the endpoint of the tunnel in the VNE, wherein the endpoint of the tunnel in the VNE generates, according to the tunnel service information, a local tunnel forwarding entry for the endpoint of the tunnel in the VNE.

18. A network device, comprising:

a non-transitory computer readable storage medium to store programs, and computer hardware configured to implement, including configured by the programs to implement:

a tunnel service information generating unit, configured to generate, according to a preconfigured tunnel service, tunnel service information with a VNE being a single network element; wherein:

the tunnel service information comprises an outgoing label of a tunnel in the VNE, an outbound interface identifier of the tunnel in the VNE, a global tunnel identifier tunnel ID, and an IP address of an endpoint of the tunnel that corresponds to the tunnel service information outside the VNE, or the tunnel service information comprises an inbound interface identifier of the tunnel in the VNE and an incoming label of the tunnel in the VNE;

a tunnel endpoint determining unit, configured to determine one of multiple nodes in the VNE as an endpoint of the tunnel that corresponds to the tunnel service information in the VNE; and a tunnel service information sending unit, configured to send the tunnel service information to the endpoint of the tunnel in the VNE, wherein the endpoint of the tunnel in the VNE generates, according to the tunnel service information, a local tunnel forwarding entry for the endpoint of the tunnel in the VNE.

* * * * *